United States Patent
Slater et al.

(10) Patent No.: US 11,835,404 B1
(45) Date of Patent: Dec. 5, 2023

(54) THINLINE TOWED ARRAY TENSION SENSOR

(71) Applicant: The United States Government of America as represented by the Secretary of the Navy, Newport, RI (US)

(72) Inventors: William H Slater, New Bedford, MA (US); Brian K Amaral, Newport, RI (US); Michael R Williams, West Kingston, RI (US); Robert F Cutler, III, Tiverton, RI (US); Kimberly M Cipolla, Portsmouth, RI (US)

(73) Assignee: The United States of America as represented by the Secretary of the Navy

( * ) Notice: Subject to any disclaimer, the term of this patent is extended or adjusted under 35 U.S.C. 154(b) by 323 days.

(21) Appl. No.: 17/476,519

(22) Filed: Sep. 16, 2021

(51) Int. Cl.
  *G01L 1/22* (2006.01)
  *G01L 5/10* (2020.01)

(52) U.S. Cl.
  CPC .......... *G01L 1/2212* (2013.01); *G01L 1/2287* (2013.01); *G01L 5/10* (2013.01)

(58) Field of Classification Search
  CPC ........ G01L 1/2212; G01L 1/2287; G01L 5/10
  See application file for complete search history.

(56) References Cited

U.S. PATENT DOCUMENTS

| | | | | |
|---|---|---|---|---|
| 5,855,179 A | * | 1/1999 | Wood | B63B 21/16 114/244 |
| 5,948,959 A | * | 9/1999 | Peloquin | G01V 13/00 367/154 |
| 6,253,627 B1 | * | 7/2001 | Lee | G01L 5/102 367/20 |
| 6,378,383 B1 | * | 4/2002 | Lee | G01V 1/201 367/20 |
| 2004/0013036 A1 | * | 1/2004 | Fageras | G01V 1/201 367/15 |

* cited by examiner

*Primary Examiner* — Kyung S Lee
(74) *Attorney, Agent, or Firm* — James M. Kasischke; Michael P. Stanley; Jeffry C. Severson (57) ABSTRACT

A tension sensor includes a planar tab having a first and second side, first and second end sections and an aperture through each of the end sections. A first strain gage is attached to the first side of the tab. The first strain gage has a tension grid aligned to a longitudinal axis of the tab and a cross-tension grid perpendicular to the tension grid. A second strain gage is attached to the second side of the tab. The second strain gage has a tension grid aligned to the longitudinal axis of the tab and a cross-tension grid perpendicular to the tension grid. The first strain gage and second strain gage are wired in a Wheatstone bridge in which the tension grid and the cross-tension grid of the first strain gage form one side and the tension grid and the cross-tension grid of the second strain gage form another side.

10 Claims, 7 Drawing Sheets

FIG. 1

-PRIOR ART-

THINLINE TOWED ARRAY TENSION SENSOR

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS REFERENCE TO OTHER APPLICATIONS

None.

BACKGROUND OF THE INVENTION

1) Field of the Invention

The present invention relates generally to thin-line towed arrays, and more particularly to an apparatus that measures tension in a thin-line towed array.

2) Description of Related Art

Naval vessels use thin-line towed-array systems that are up to several miles in length and contain a network of delicate telemetry and sensor components. Each module of the thin-line array includes an outer sheath or hose that contains hydrophones and supporting electronics.

Figure 1:
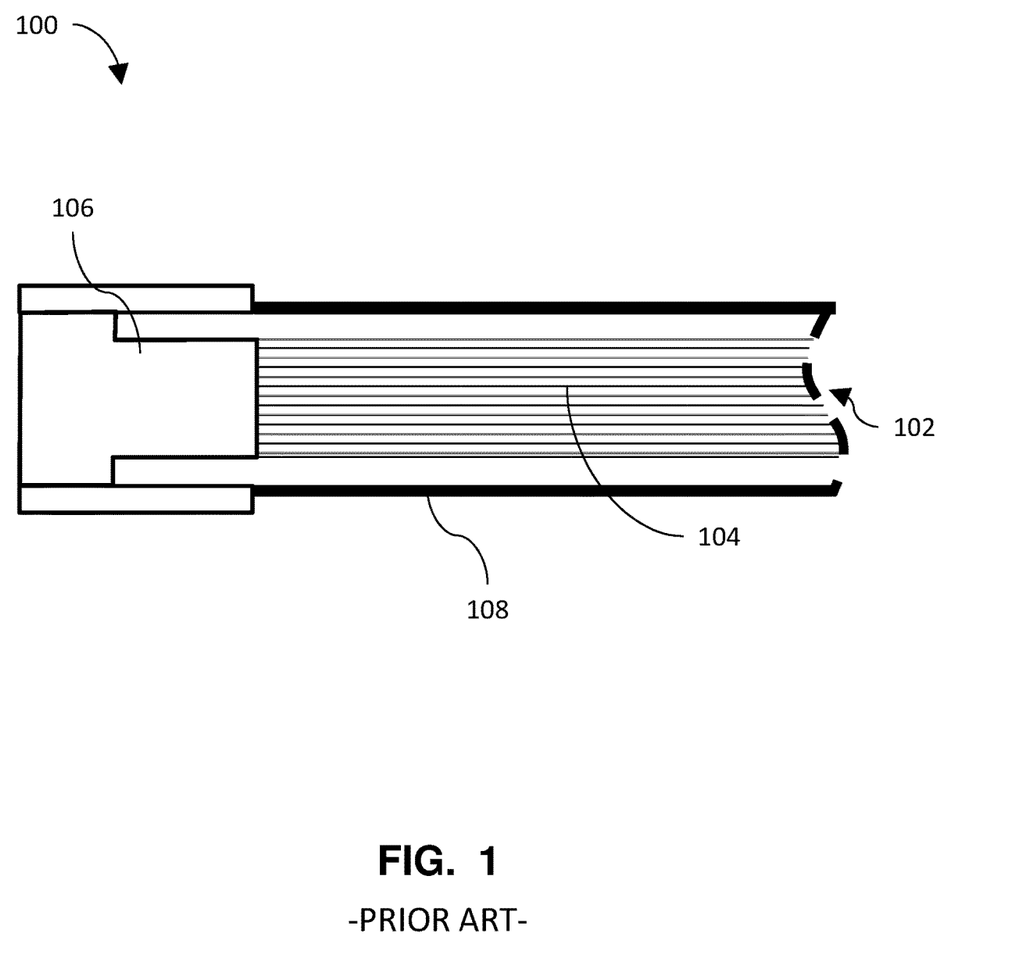
FIG. 1 is a prior art and cross-sectional view of an end of a towed array module.

Referring to prior art of FIG. 1, each module 100 includes an Internal Strength Member (ISM) 102. The ISM 102 comprises ropes 104 that terminate on a clevis 106 at each end of the module 100. The ISM 102 is contained within an array hose 108. The module 100 elongates under tension. The tension can be measured with a tension sensor.

Accordingly, substantive improvements in tension sensors are needed for towed arrays. However, developing a sensor for the thinline, towed array may be challenging because of the small diameter and other integration requirements.

SUMMARY OF THE INVENTION

The present invention uses a planar tab that facilitates a tension sensor function as well as the construction of the strength package in the towed array where the tension sensor is installed.

The tension sensor includes the planar tab having a first side and a second side, a first end section and a second end section, and an aperture or hole through each of the end sections. A first strain gage is positioned on the first side of the tab. The strain gage has a tension grid aligned with a longitudinal axis of the tab and a cross-tension grid perpendicular to the tension grid. A second strain gage attaches to the second side of the tab. The second strain gage has a tension grid aligned with the longitudinal axis of the tab and a cross-tension grid perpendicular to the tension grid.

The first strain gage and the second strain gage are wired in a Wheatstone bridge in which the tension grid and the cross-tension grid of the first strain gage form one side of the Wheatstone bridge and the tension grid and the cross-tension grid of the second strain gage form another side of the Wheatstone bridge. Voltage change across the Wheatstone bridge is measured as a function of strain on the tab.

An array hose is formed as part of the thin-line towed array with an internal strength member inside the hose. A clevis defines a termination point of a module of the array. The hose and the strength member connect to the clevis. The internal strength member includes a plurality of ropes that terminate on the clevis. Typically, there is a clevis or termination point on both ends of the towed array. The tension sensors attach to a portion of the plurality of ropes.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Strain may be defined as deformation experienced by a body resulting from an application of force. According to an inventive apparatus described herein, a tension sensor fits within a small diameter array hose such as an array hose 108. That is, the outer diameter and rigid length of the tension sensor must be less than the maximum that the array hose 108 can accommodate. Larger diameters must have proportionally smaller rigid lengths.

Figure 2:
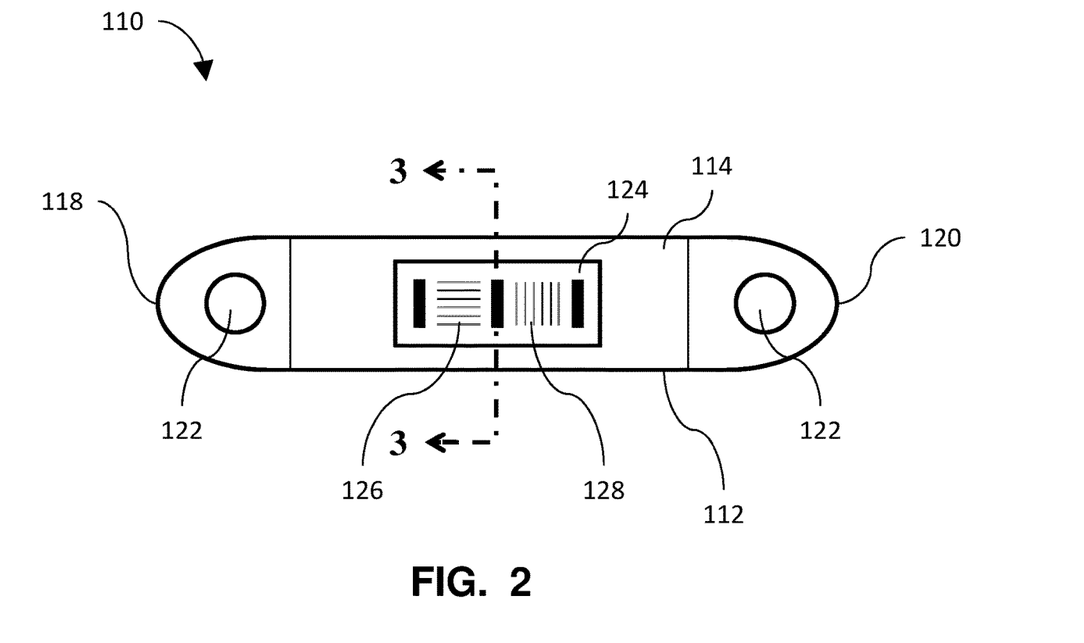
FIG. 2 depicts a tension tab with a mounted first strain gage in accordance with the present invention.

A strain gage measures the amount of strain on a given object by converting a dimension change to a change in electrical resistance. Referring to FIG. 2, a tension sensor 110 of the present invention includes a planar tab 112 having a first side 114 and a second side 116. The tab 112 may be made of titanium.

The planar tab 112 has a first end section 118 and a second end section 120. Apertures or holes 122 are provided through each of the end sections 118, 120. A first strain gage 124 attaches to the first side 114 of the tab 112. The strain gage 124 has a tension grid 126 aligned with a longitudinal axis of the tab 112 and a cross-tension grid 128 perpendicular to the tension grid 126.

Figure 3:
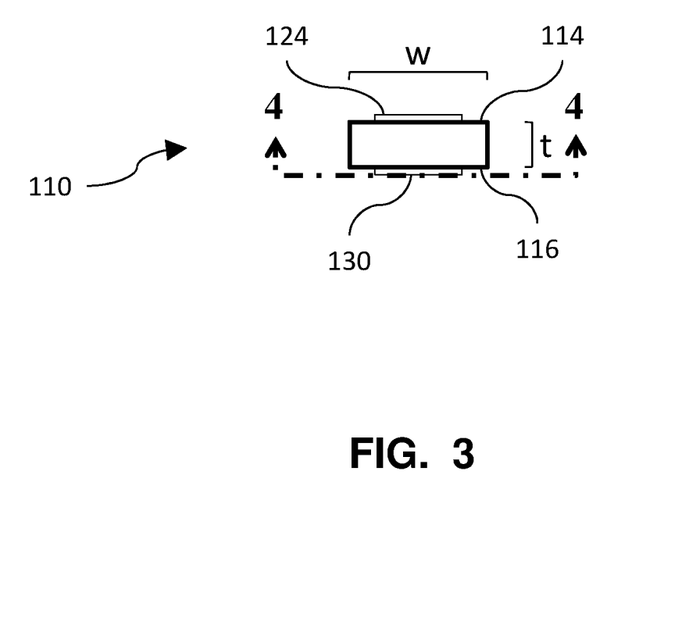
FIG. 3 depicts a cross-section of a tension tab taken along reference line 3-3 of FIG. 2.
Figure 4:
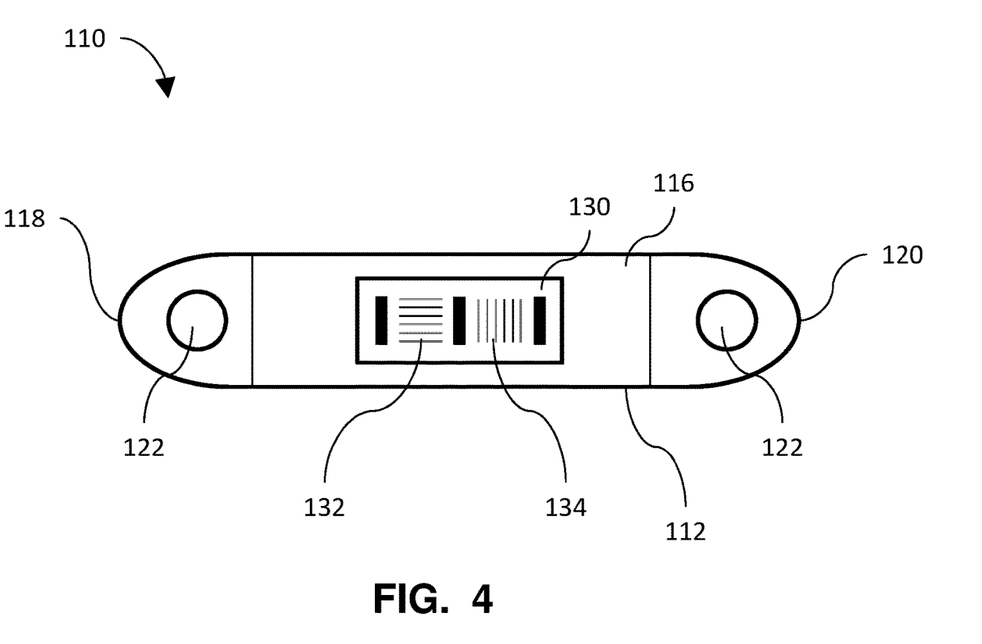
FIG. 4 depicts a tension tab with a mounted second strain gage in accordance with the present invention with the view taken along reference line 4-4 of FIG. 3.

Referring to FIG. 3 and FIG. 4, a second strain gage 130 attaches to the second side 116 of the planar tab 112. The second strain gage 130 has a tension grid 132 aligned to the longitudinal axis of the tab 112 and a cross-tension grid 134 perpendicular to the tension grid 132. In use, some of the ropes 104 from the ISM 102 are spliced into the apertures or holes 122 at each end section 118, 120 of the tab 112. The strain gages 124, 130 bond to the sides 114, 116 of a middle section of the tab 112. Tension on the ISM 102 is transmitted into the tab 112 and measured by the strain gages 124, 130.

The cross-sectional area, "A" of the tab 112 is calculated in Equation (1) from the definition of Young's Modulus, where "F" is the maximum design tension, "E" is Young's Modulus, and "ϵ" is the strain when the maximum design tension is applied.

$$A = \frac{F}{E\epsilon} \quad (1)$$

In this example, T-rosette strain gages are used. The cross sectional area of the tab 112, A=w*t, is set by choosing ϵ to be 2,000με—per the specifications of the strain gage manufacturer. And F is set to match the breaking strength of the rope 104 that the tab 112 interrupts (1,200 pounds in this situation). Accordingly, the rope 104 will break before the tab 112 exceeds the region of elastic deformation for the rope. The stress concentration at the apertures 122 on each side 114, 116 determine the required thickness. In the described examples, Titanium Ti6A14V was used to keep thickness to a minimum while preserving strength, but unalloyed titanium, aluminum, or aluminum alloys could also meet strength requirements and fit in the towed array module 100.

Figure 5:
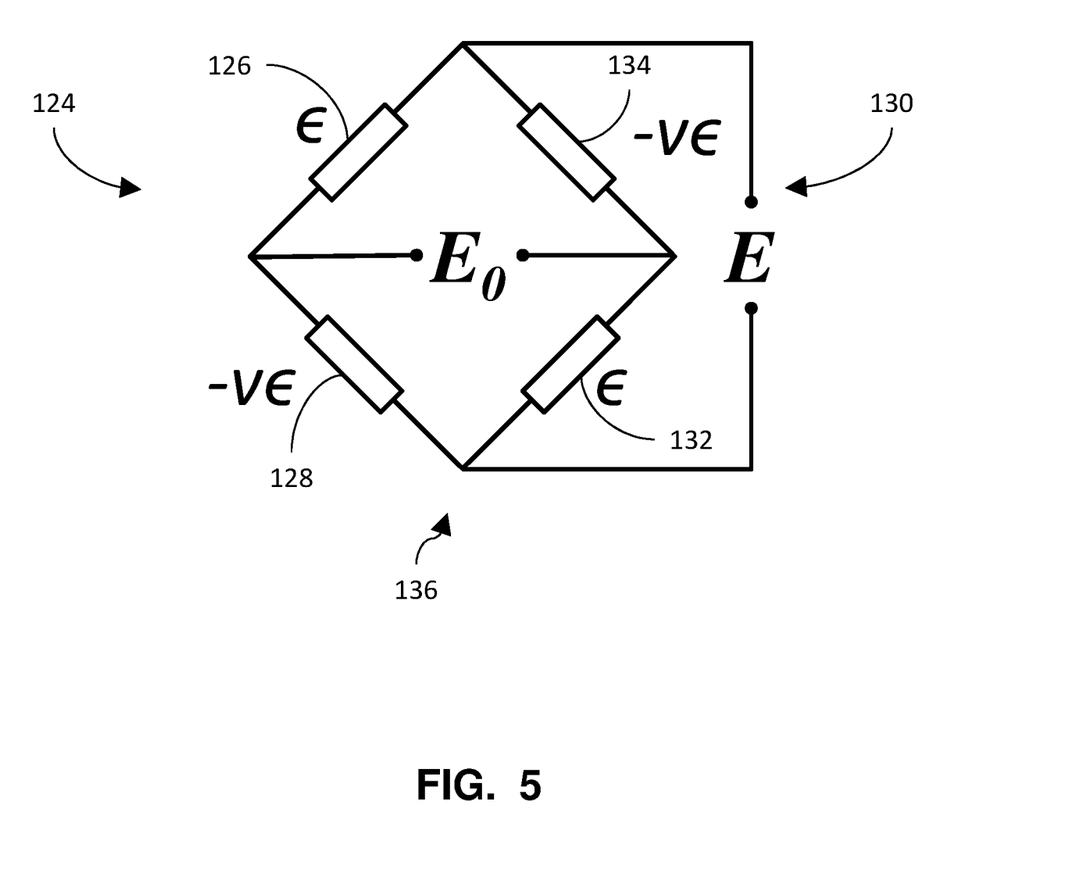
FIG. 5 depicts a Wheatstone bridge in accordance with the present invention.

As shown in FIG. 5, the first strain gage 124 and the second strain gage 130 (depicted in the preceding figures) are wired in a Wheatstone bridge 136 in which the tension grid 126 and the cross-tension grid 128 of the first strain gage form one side of the Wheatstone bridge and the tension grid 132 and the cross-tension grid 134 of the second strain gage 130 form another side of the Wheatstone bridge.

The tension-induced strain proportionally changes the voltage $E_0$. "E" is the excitation voltage supplied to the Wheatstone bridge 136. The resistance of the tension grid 126, 132 parallel to the tension axis (the longitudinal axis of the tab 112) varies linearly with strain (ϵ) along the tension axis and the resistance of the cross-tension grid 128, 134 perpendicular to the tension axis varies linearly with perpendicular strain (−vϵ) where v is Poisson's ratio. The cross-tension grid 128, 134 leverages Poisson's effect to prevent thermal expansion and contraction in the tab 112 from affecting $E_0$. In another embodiment, mounting cages can be used on each side of the tab 112 to prevent bending from affecting $E_0$.

The response of the Wheatstone bridge 136 is calculated by Equation (2)

$$R = \frac{E_0}{E} = \frac{G\epsilon(1+v) \times 10^{-3}}{2 + G\epsilon(1-v) \times 10^{-6}} \quad (2)$$

where "R" is the bridge output in mV/V, "G" is the gage factor provided by the manufacturer, and "v" is Poisson's ratio of the material on which the gage is mounted, 0.342 for Ti6A14V in this case. Equation (2) can be used with Young's modulus to calculate responses.

Figure 6:
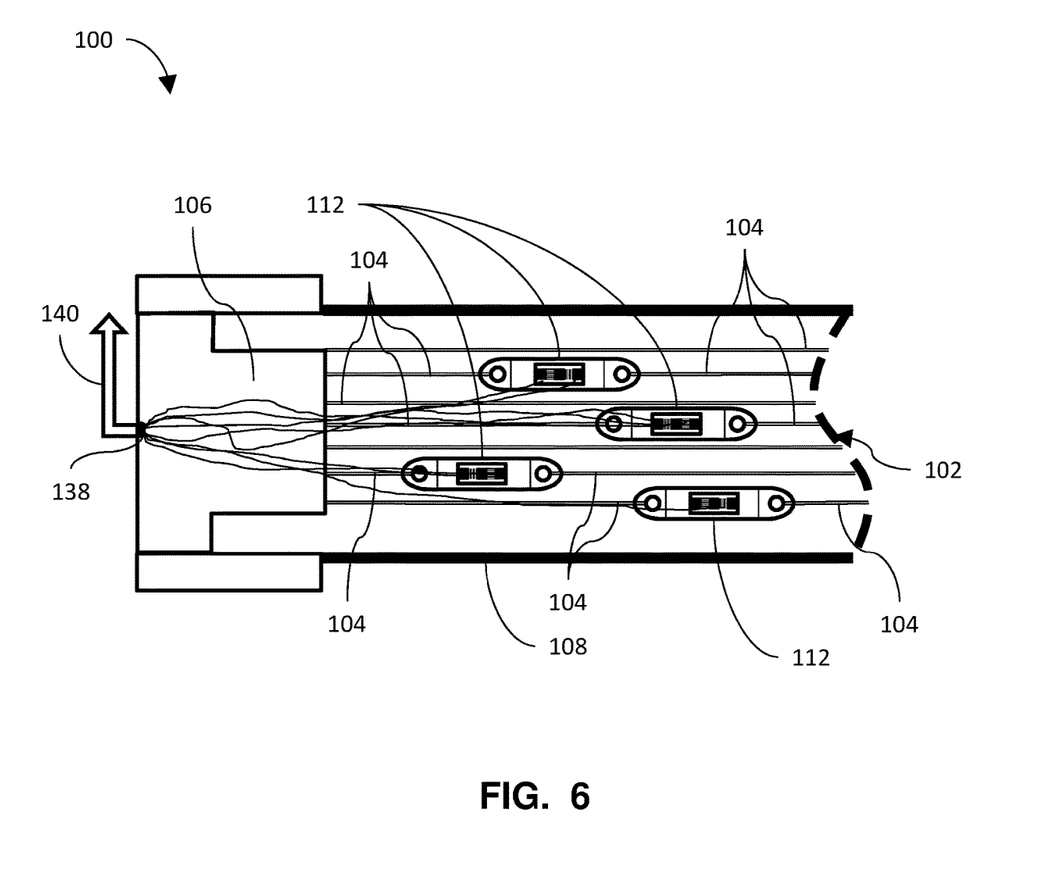
FIG. 6 depicts a sensor node with four strain gages where elongation is linearly proportional to tension in the range of interest.

The tension sensor 110 interfaces with the telemetry of the thinline towed array. A sensor node relays a voltage measurement up the data stream of the towed array. Two voltage inputs are used by the sensor node and the node provides the voltage excitation for use in the resistive tension sensing element. As shown in FIG. 6; the sensor node uses two full-bridge inputs; thus, four tabs 112 can be wired in two pairs of two tabs.

Each of the four tabs 112 has the strain gages 124, 130 arranged in a full-bridge output. The strain gages 124, 130 are not shown for clarity in FIG. 6 but are shown and described for FIG. 2 and FIG. 4. Since the sensor node has two full-bridge inputs, the four tabs 112 are wired in two pairs of two tabs. The strain gages 124, 130 measure strain by changing electrical resistance in response to elongation. The strain gages 124, 130 are mounted to the four tabs 112 where elongation is linearly proportional to tension in the range of interest. The resistance change is measured by the towed array telemetry as a voltage change across the strain gages 124, 130.

The tabs 112 are spliced into four of the ropes 104 in the ISM 102. For accuracy and stability, a tab 112 could be spliced into each of the ropes 104, but the sensor node in the towed array only uses two inputs. Data from the four tabs 112 is averaged in pairs in order to provide two outputs for input to the sensor node.

Figure 7:
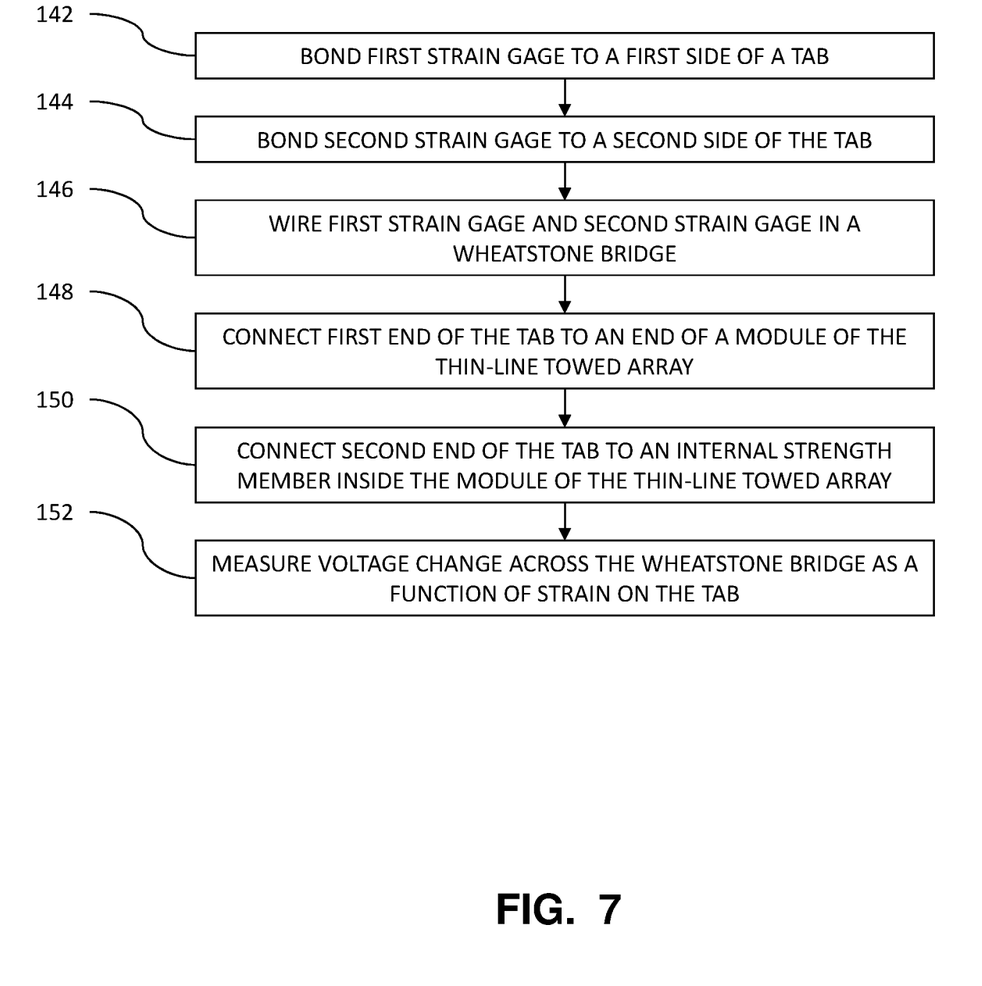
FIG. 7 is a flow chart of the method of use of the tension sensor in accordance with the present invention.

FIG. 7 is a flow chart illustrating the assembly and use of the invention. According to the invention, real time tension can be measured in a thin-line towed array. A tension sensor is integrated into the Internal Strength Member (ISM) of the Forward Interface Module (FIM) at the front of the towed array and measures the tension due to drag along the towed array.

At step 142, a first strain gage is bonded to a first side of a tab with the tension grid of the first strain gage aligned with the longitudinal axis of the tab. At step 144, a second strain gage is bonded to a second side of the tab with the tension grid of the second strain gage aligned with the longitudinal axis of the tab. At step 146, the first strain gage and the second strain gage are wired in a Wheatstone bridge in which the tension grid and cross-tension grid of the first strain gage form one side of the Wheatstone bridge and the tension grid and cross-tension grid of the second strain gage form another side of the Wheatstone bridge.

At step 148, a first end of the tab is connected to an end of a module of the thin-line towed array. At step 150, a second end of the tab connects to the internal strength member inside the module of the thin-line towed array. At step 152, voltage change across the Wheatstone bridge is measured as a function of strain on the tab.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A tension sensor for thin-line towed arrays, said tension sensor comprising:
    a planar tab having a first side and a second side, a first end section and a second end section with at least one aperture through each of the first end section and the second end section;
    a first strain gage affixed to the first side of said planar tab;
    a tension grid positioned on a longitudinal axis of said first strain gage;
    a cross-tension grid positioned perpendicular to said tension grid on said first strain gage;
    a second strain gage attached to the second side of said planar tab;
    another tension grid aligned to said longitudinal axis of said second strain gage; and
    another cross-tension grid positioned perpendicular to said another tension grid on said second strain gage;

wherein said first strain gage and said second strain gage are wired in a Wheatstone bridge in which said tension grid and said cross-tension grid of said first strain gage form one side of said Wheatstone bridge and said another tension grid and said another cross-tension grid of said second strain gage form another side of said Wheatstone bridge.

2. The tension sensor according to claim 1, said tension sensor further comprising a plurality of ropes as a strength member wherein a first end of a first portion of a rope of said plurality of ropes is attached to the first end section of said planar tab; and wherein a second end of said first portion of said rope is attached to a first termination point;

wherein a first end of a second portion of said rope of said plurality of ropes is attached to the second end section of said planar tab;

wherein a second end of said second portion of said rope of said plurality of ropes is attached to a second termination point with said planar tab being positioned between said first termination point and said second termination point to measure strain in said strength member.

3. An apparatus for measuring tension in a thin-line towed array, said apparatus comprising:

a towed array hose;

an internal strength member encompassed by said towed array hose with said internal strength member having a plurality of ropes;

a clevis connected to said towed array hose and said plurality of ropes of said internal strength member with said clevis defining an end of a module of the thin-line towed array; and a plurality of tension sensors connected to a portion of said plurality of ropes;

wherein said tension sensors comprise strain gages having a plurality of tension grids and a plurality of cross-tension grids wired in a Wheatstone bridge in which a tension grid and a cross-tension grid of a first strain gage form one side of said Wheatstone bridge and a tension grid and a cross-tension grid of a second strain gage form another side of said Wheatstone bridge.

4. The apparatus according to claim 3, wherein each of said tension sensors further comprises a tab having a first side and a second side wherein said first strain gage is affixed to the first side of said tab and said second strain gage is affixed to the second side of said tab.

5. The apparatus according to claim 4, wherein first tension grid and said second tension grid align to a longitudinal axis of said tab.

6. A method of measuring tension in a thin-line towed array, said method comprising the steps of:

attaching a first strain gage to a first side of a planar tab wherein the first strain gage includes a tension grid that aligns with a longitudinal axis of the tab and a cross-tension grid perpendicular to the tension grid;

attaching a second strain gage to a second side of the tab, wherein the second strain gage includes a tension grid and a cross-tension grid perpendicular to the tension grid and wherein the tension grid of the second strain gage aligns with the longitudinal axis of the planar tab;

wiring the first strain gage and the second strain gage in a Wheatstone bridge in which the tension grid and cross-tension grid of the first strain gage form one side of the Wheatstone bridge and the tension grid and cross-tension grid of the second strain gage form another side of the Wheatstone bridge;

connecting a first end of the tab to an end of a module of the thin-line towed array;

connecting a second end of the tab to an internal strength member inside a module of the thin-line towed array; and measuring voltage change across the Wheatstone bridge as a function of strain on the planar tab.

7. The method according to claim 6, wherein said measuring voltage change step further comprises supplying an excitation voltage to the Wheatstone bridge wherein tension-induced strain on the tension grids and cross-tension grids of the first strain gage and the second strain gage proportionally changes output voltage from the Wheatstone bridge.

8. The method according to claim 7, said method further comprising the steps of:

providing a plurality of planer tabs connected to the internal strength member; and wiring pairs of the tabs together to connect inputs and outputs of the Wheatstone bridge of a first tab in a pair to inputs and outputs of the Wheatstone bridge of a second tab in the pair.

9. The method according to claim 8, wherein the internal strength member includes a plurality of ropes connected to the module of the thin-line towed array, and tabs are spliced into four of the plurality ropes; and wherein, a first pair of tabs is wired together to connect inputs and outputs of the Wheatstone bridge of a first tab in the first pair to inputs and outputs of the Wheatstone bridge of a second tab in the first pair and a second pair of tabs is wired together to connect inputs and outputs of the Wheatstone bridge of a first tab in the second pair to inputs and outputs of the Wheatstone bridge of a second tab in the second pair.

10. The method according to claim 9, wherein the tab includes apertures at each of the first end section and the second end section; and wherein a portion of the internal strength member is spliced onto the apertures.

* * * * *